Oct. 13, 1953  F. H. MOORE  2,655,443
SYNTHESIS GAS GENERATION
Filed March 2, 1948
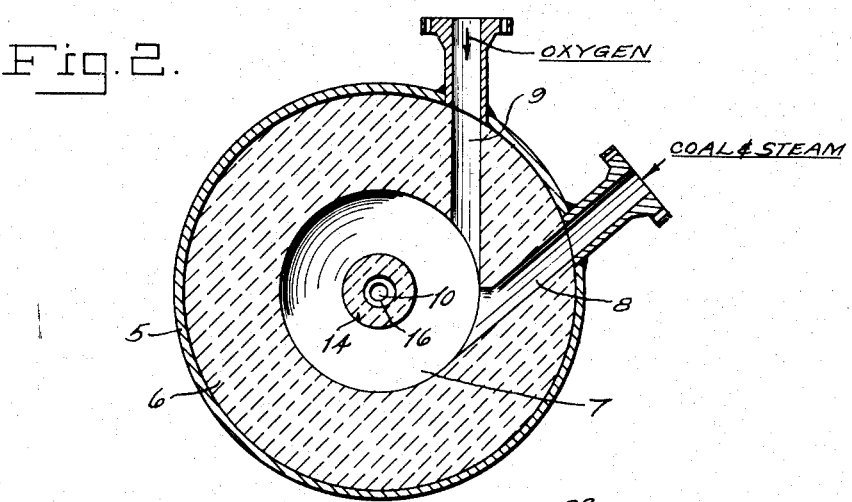
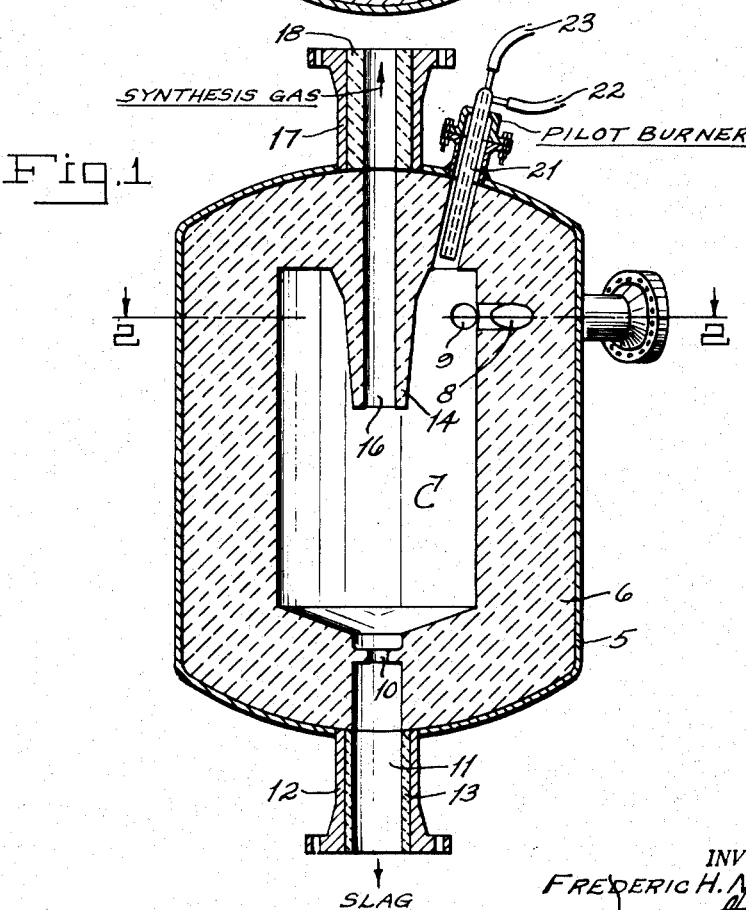
INVENTOR.
FREDERIC H. MOORE
BY
ATTORNEYS Patented Oct. 13, 1953

2,655,443

UNITED STATES PATENT OFFICE 2,655,443

SYNTHESIS GAS GENERATION

Frederic H. Moore, Long Beach, Calif., assignor to The Texas Company, New York, N. Y., a corporation of Delaware Application March 2, 1948, Serial No. 12,555

2 Claims. (Cl. 48—206)

This invention relates to a process and apparatus for the generation of gases comprising carbon monoxide from carbonaceous materials. In one of its more specific aspects it relates to a process and apparatus for the generation of a mixture of carbon monoxide and hydrogen, suitable as a feed for the synthesis of hydrocarbons, from powdered coal.

The synthesis of hydrocarbons by the interaction of carbon monoxide and hydrogen is well known. A number of processes are known to be effective for hydrocarbon synthesis. In general liquid hydrocarbons are most effectively produced by the interaction of carbon monoxide and hydrogen at an elevated temperature and pressure in the presence of a suitable catalyst, usually an element of the iron group of the periodic table of the elements.

The present invention is concerned with the generation of a mixture of carbon monoxide and hydrogen. The invention is particularly suited to the production of a feed gas for the synthesis of hydrocarbons. Various solid carbonaceous fuels may be used, e. g. coal, lignite; and the like.

An object of this invention is to provide a process for the generation of carbon monoxide and hydrogen from carbonaceous materials.

Another object is to provide a process particularly suited to the generation of a feed gas for the synthesis of hydrocarbons from coal.

A further object of this invention is to provide apparatus for the generation of carbon monoxide and hydrogen from carbonaceous materials.

Gasification of powdered coal by partial combustion in cylindrical generators has been proposed heretofore. To the best of my knowledge, however, these have not been commercially successful. Reactors of this sort were tried in Germany but were not developed beyond the experimental stage. Many problems remained unsolved when the work was abandoned. Difficulties particularly were experienced in obtaining substantially complete reaction of carbon and in preventing undesirable slag accumulation due to fusion of the ash. The method and apparatus of my invention provides a high rate of carbon reaction, resulting in efficient carbon utilization. Handling of slag is accomplished without particular difficulty due to the improved method and apparatus by which the slag is maintained in molten condition.

In the gasification of carbonaceous material with oxygen, particularly solid fuels, the reaction between the oxygen and fuel results in the production of carbon dioxide according to the equation:

$$C+O_2=CO_2$$

The oxidation reaction, being highly exothermic, releases large quantities of heat.

The carbon dioxide, so produced, in contact with hot carbon, in turn, reacts with the carbon to produce carbon monoxide:

$$CO_2+C=2CO$$

Steam also reacts with heated carbon to produce carbon monoxide and hydrogen:

$$H_2O+C=CO+H_2$$

These reactions are endothermic and require heat from another source. Heat for the endothermic reactions may be supplied from the exothermic reaction. Thus, in a gas generator there should be a free transfer of heat between the zone in which carbon dioxide is formed and the zone in which carbon dioxide is consumed by reaction with carbon.

The water gas shift reaction:

$$CO+H_2O=CO_2+H_2$$

also takes place in the generator. The water gas shift reaction has little influence on the thermal balance in the generator. At high temperatures, above about 1500° F., the products on the left hand side of the equation tend to predominate as governed by the well known laws of chemical equilibria whereas the converse is true at low temperatures. The quantity of hydrogen in the product gas may be controlled by control of conditions affecting the water gas shift reaction. Thus hydrogen may be generated at the expense of carbon monoxide in a shift converter, as is known in the art, or the reaction effluent from the generator may be quenched to substantially prevent the water gas shift reaction on cooling of the effluent.

The present invention will be described, for the sake of simplicity, with reference to coal as a fuel. It will be understood that coal is used as a specific example and that the apparatus and method described is not necessarily limited to the use of coal.

In accordance with this invention, coal is crushed and charged into the reaction zone in suspension in steam. Oxygen is introduced into the reactor separately and brought into intimate contact with the particles of coal. Preferably the oxygen-containing gas has an oxygen concentration of 90 per cent by volume or greater and is preheated prior to introduction into the reactor. Oxygen produced by many of the commercial oxygen processes is suited as the oxygen-containing gas fed to the generator. When contacted with concentrated oxygen, very rapid oxidation of the exterior surface of the particle of coal takes place. The coal particles are further broken down on heating. The coal and oxygen are fed into the generator in a novel manner, as is described in detail hereinafter, which permits operation at high temperature while at the same time protecting the walls of the reactor from excessive localized overheating.

The exothermic reaction or burning which takes place upon contact between the coal and oxygen releases heat which is utilized in a very effective and efficient manner in this invention to supply heat for ensuing endothermic reactions. Gases comprising carbon monoxide, carbon dioxide and hydrogen result from the oxidation of the carbon in the presence of steam. The steam and carbon dioxide react with the highly heated carbon in the coal to produce the desired carbon monoxide and hydrogen.

Due to the novel manner in which reactants are fed into and gaseous products are withdrawn from the reaction zone, efficient heat transfer and effective reaction conditions are obtained. This efficient heat transfer is also thought to be enhanced by effective mixing and unimpeded radiation from exothermic to endothermic points of reaction.

Elevated temperature and pressure are beneficial to the desired reactions in the overall process. Temperatures within the range of 2000–4000° F. are desirable; the temperature is limited by the available materials of construction. Temperatures as high as materials of construction will permit are desirable to give high reaction rates, particularly in the case of the endothermic reactions. Elevated pressure increases the concentrations of the gaseous reactants. Preferably, a pressure in excess of 100 pounds per square inch gauge is used.

The apparatus described herein and forming a part of my invention provides for carrying out the reaction in a most efficient manner as will be more fully brought out in the following detailed description with reference to the accompanying drawings.

Fig. 1 is a vertical cross-sectional view of a preferred embodiment of apparatus forming a part of my invention.

Fig. 2 is a horizontal cross-sectional view taken along the plane 2—2 of Fig. 1.

The generator illustrated in the drawings is particularly suited for the gasification of powdered coal for the generation of synthesis gas. For the purpose of facilitating the detailed description of the apparatus illustrated, the description will be made throughout with reference to powdered coal. Other solid carbonaceous materials may be used, for example, coke, lignite, and the like.

With reference to the drawings, the generator is provided with an outer cylindrical steel shell 5 capable of withstanding the operating pressure and a refractory lining 6 of a material suited to the temperature conditions encountered in operation. Crushed coal in admixture with super-heated steam is introduced into the upper end of the elongated, cylindrical, vertical reaction zone 7 through a port 8. Oxygen is introduced into the reaction zone through a port 9 which discharges the oxygen stream directly into the stream of coal and steam. Both the stream of coal and steam and the stream of oxygen are introduced into the upper end of the reaction zone at its periphery and substantially tangent thereto. By this arrangement the coal and oxygen are intimately admixed within the reaction zone, and the stream of oxygen is prevented from directly impinging on the wall of the reactor. The reactor wall is protected from the oxygen introduced through port 9 by the stream of coal and steam introduced through port 8.

The oxygen and coal react immediately with the liberation of large quantities of heat. The gases and heated carbon particles resulting from the oxidation reaction are carried downwardly in reaction zone 7 adjacent its periphery or the inner wall of the vessel. The tangential introduction of the reactants imparts a swirling motion to the gas stream and the particles of heated carbon. Carbon dioxide in the hot gas stream reacts with the heated carbon particles in the lower portion of the zone to produce carbon monoxide.

Molten ash and slag thrown out of the gas stream by the whirling motion of the gases are collected at the lower end of the reaction zone from whence they are discharged through slag tap 10 into the exit conduit 11. The slag disposal piping 12 is lined with a refractory material 13.

Product gases comprising carbon monoxide and hydrogen are withdrawn from a point along the axis of the reaction zone below the point of introduction of reactants. The synthesis gas so produced is withdrawn from the reaction zone through a chimney 14 which extends into the reaction zone to a point slightly above its center. The synthesis gases are discharged through the outlet duct 16 into the discharge line 17 which is provided with a refractory lining 18. The synthesis gas may be quenched as by contact with a spray of water and further cooled by passage through a waste heat boiler for the generation of steam.

A pilot burner 21 extends through an opening in the upper portion of the vessel above the point at which the oxygen and the coal meet. Fuel gas is supplied to the burner through line 22 and oxygen through line 23.

Any entrained particles of molten ash discharged with the synthesis gas are converted on cooling to small solid particles in the form of fly ash which can be readily removed from the synthesis gas.

In the operation of the generator, crushed coal having a particle size of about ¼ inch in diameter is injected into the generator through port 8 by suspension in a stream of super-heated steam at a pressure sufficient to cause flow through port 8 at a relatively high velocity. Oxygen under pressure is fed into the generator through port 9 at a velocity sufficient to insure mixing with the coal. Particles of coal are carried in the gas streams around the periphery of the reaction zone at the point of introduction of the reactants, insuring ample opportunity for thorough admixture of coal and oxygen.

Preferably, the oxygen is heated to a temperature of 400–600° F. prior to introduction into the reactor and preferably to a temperature as high as materials of construction permit. The steam may be heated to any desired temperature, preferably 500° F. or higher. Steam may be heated to temperatures of 1000–1500° F. in tube type furnaces and as high as about 4000° F. by direct contact with hot solids. The pebble heater is suitable for heating steam to temperatures above 1000° F.

In the description of the apparatus, the coal and steam enter one of the ports and oxygen enters the other. While this particular arrangement is very satisfactory and probably generally preferred, it is not essential to successful operation. A gas other than steam may be used for propelling the coal into the generator. A hydrocarbon gas, for example, is suitable either alone or in admixture with steam. The oxygen-containing gas may also be used subject to the problems and limitations imposed by preoxidation of the coal particles which is sometimes desirable to prevent agglomeration. Steam may, of course, be admixed with the oxygen admitted through either port. Regardless of the combination of entering reactants, it is desirable to introduce the reactants tangentially and to include steam, oxygen, and solid carbon in the feed streams. The particular apparatus and novel method of this invention offer advantages of simplicity, while retaining efficiency of operation not realized by any systems of the prior art of which I am aware.

In the interests of simplicity of illustration and description, auxiliary equipment not necessary to the description of the generator has been omitted. Details of the quench of the synthesis gas and disposal of slag have been omitted since they are not essential to the invention. The synthesis gas may be quenched by direct contact with a spray of water. Particles of entrained ash or slag may be separated in conventional manner, e. g., by means of a cyclone type separator. The slag is conveniently disposed of by discharging it into water in a separate vessel maintained at the same pressure as the generator. Other forms of apparatus may be used for carrying out the process of this invention.

Obviously many modifications and variations of the invention as hereinabove set forth may be made without departing from the spirit and scope thereof and therefore only such limitations should be imposed as are indicated in the appended claims.

I claim:

1. In a process for the production of a gaseous mixture comprising hydrogen and carbon monoxide from a solid carbonaceous fuel by reaction with steam and oxygen, the improvement which comprises introducing a stream of solid carbonaceous fuel suspended in steam into an elongated vertical cylindrical reaction zone at a point adjacent the upper end thereof and in a direction substantially tangent to the periphery of said zone, introducing a stream of oxygen-containing gas free from fuel into said zone at a point adjacent and upstream of said point of introduction of said stream of steam and solid fuel into confluence with said stream of steam and particulate carbonaceous material whereby the reactants and resulting product gases are given a spiral motion downwardly along the wall of the reaction zone, and withdrawing all of the gaseous product comprising carbon monoxide and hydrogen axially through the upper portion of the reaction zone from a point within said zone along the axis thereof below the point of introduction of said reactants and above the center of said zone, all of the reactants being introduced into said zone above the level of said point of withdrawal, whereby the reactants and resulting reaction products form a stream flowing spirally downwardly in an annulus from the upper portion of the reaction zone to the lower portion of said zone and thence upward along the axis thereof to said point of withdrawal in direct radiant heat transfer relation with said downwardly flowing spiral.

2. A process as defined in claim 1 wherein said oxygen-containing gas contains in excess of 90 volume per cent oxygen.

FREDERIC H. MOORE.

References Cited in the file of this patent

UNITED STATES PATENTS

| Number | Name | Date |
|---|---|---|
| 1,833,964 | Cross | Dec. 1, 1931 |
| 1,924,856 | Heller | Aug. 29, 1933 |
| 2,028,946 | Niconoff | Jan. 28, 1936 |
| 2,302,156 | Totzek | Nov. 17, 1942 |
| 2,388,348 | Stimson | Nov. 6, 1945 |